United States Patent
Schilling et al.

(10) Patent No.: US 8,448,586 B2
(45) Date of Patent: *May 28, 2013

(54) PLANTING UNIT

(75) Inventors: Robin B. Schilling, Darfield (CA);
Matthew S. Naylor, Saskatoon (CA);
Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,013

(22) Filed: Jun. 7, 2012

(65) Prior Publication Data

US 2012/0240834 A1    Sep. 27, 2012

Related U.S. Application Data

(60) Division of application No. 12/493,791, filed on Jun. 29, 2009, now Pat. No. 8,215,247, which is a continuation-in-part of application No. 12/266,310, filed on Nov. 6, 2008, now Pat. No. 7,814,847.

(51) Int. Cl.
| | |
|---|---|
| *A01C 7/06* | (2006.01) |
| *A01C 5/068* | (2006.01) |
| *A01C 7/206* | (2006.01) |
| *A01C 7/201* | (2006.01) |
| *A01B 49/06* | (2006.01) |
| *A01C 5/064* | (2006.01) |
| *A01C 7/203* | (2006.01) |
| *A01B 23/06* | (2006.01) |
| *A01B 15/16* | (2006.01) |

(52) U.S. Cl.
USPC ........................................................ 111/186

(58) Field of Classification Search
USPC .................. 111/187, 186, 129; 172/558–566, 172/606, 610
See application file for complete search history.

(56) References Cited

U.S. PATENT DOCUMENTS

| | | | |
|---|---|---|---|
| 191,054 A | 5/1877 | Hill |
| 1,006,771 A | 10/1911 | Metzler |
| 1,058,657 A | 4/1913 | Broman et al. |
| 1,168,594 A | 1/1916 | Berendes |
| 1,229,194 A | 6/1917 | Patric |
| 1,234,372 A | 7/1917 | Miller |
| 1,317,402 A | 9/1919 | Taylor |
| 1,901,299 A | 3/1933 | Johnson |
| 2,341,795 A | 2/1944 | Kriegbaum et al. |
| 2,577,775 A | 12/1951 | Lemmon et al. |
| 2,771,044 A | 11/1956 | Putifer |

(Continued)

FOREIGN PATENT DOCUMENTS

| | | |
|---|---|---|
| CA | 1294177 | 1/1992 |
| EP | 540995 | 12/1993 |

(Continued)

*Primary Examiner* — Christopher J Novosad
(74) *Attorney, Agent, or Firm* — Rebecca Henkel (57) ABSTRACT

A planting unit for depositing fertilizer and seed in a single pass, double shoot manner includes a rotating disc that cuts a furrow in a planting surface and a trailing seed boot, having a cutting edge, that cuts a vertically and horizontally offset trench in the furrow to form a seed bed in the planting surface. The disc has a mounting frame for mounting the disc to a linkage assembly that is, in turn, coupled to a toolbar mount. The seed boot is also attached to the mounting frame. This common attachment provides a relatively short and compact device without sacrificing fertilizer and seed stratification.

8 Claims, 9 Drawing Sheets

U.S. PATENT DOCUMENTS

| | | | |
|---|---|---|---|
| 2,808,792 A | 10/1957 | Brickman | |
| 2,829,577 A | 4/1958 | Williams | |
| 3,118,506 A | 1/1964 | Morris | |
| 3,244,237 A | 4/1966 | Keplinger et al. | |
| 3,362,361 A | 1/1968 | Morrison, Jr. | |
| 3,396,685 A | 8/1968 | Meiners | |
| 3,507,233 A | 4/1970 | Grieg et al. | |
| 3,718,191 A | 2/1973 | Williams | |
| 4,031,834 A | 6/1977 | Klenke | |
| 4,275,670 A | 6/1981 | Dreyer | |
| 4,331,205 A | 5/1982 | Sorenson et al. | |
| 4,366,760 A | 1/1983 | Dreyer | |
| 4,407,207 A | 10/1983 | Dreyer | |
| 4,422,392 A | 12/1983 | Dreyer et al. | |
| 4,493,274 A | 1/1985 | Robinson, Jr. et al. | |
| 4,570,554 A | 2/1986 | Clark | |
| 4,596,199 A | 6/1986 | Dietrich, Sr. et al. | |
| 4,760,806 A | 8/1988 | Bigbee et al. | |
| 4,781,129 A | 11/1988 | Swanson et al. | |
| 4,932,340 A | 6/1990 | Benzel | |
| 5,060,585 A | 10/1991 | Alexander | |
| 5,235,922 A | 8/1993 | Deckler | |
| 5,481,990 A | 1/1996 | Zacharias | |
| 5,609,114 A | 3/1997 | Barton | |
| 7,814,847 B2 * | 10/2010 | Schilling et al. | 111/129 |
| 8,015,933 B2 * | 9/2011 | Schilling et al. | 111/129 |
| 8,215,247 B2 * | 7/2012 | Schilling et al. | 111/186 |
| 8,272,339 B2 * | 9/2012 | Schilling et al. | 111/129 |
| 2002/0197133 A1 | 12/2002 | Zacharias et al. | |
| 2004/0086325 A1 | 5/2004 | Friesen et al. | |
| 2005/0120929 A1 | 6/2005 | Friesen et al. | |
| 2005/0263049 A1 | 12/2005 | Summach et al. | |
| 2005/0274309 A1 | 12/2005 | Bergen | |
| 2008/0257237 A1 | 10/2008 | Friesen et al. | |

FOREIGN PATENT DOCUMENTS

| | | |
|---|---|---|
| EP | 677239 | 10/1995 |
| EP | 1002457 | 5/2000 |
| FR | 391347 | 10/1908 |
| FR | 1576504 | 8/1969 |

* cited by examiner

PLANTING UNIT

CROSS-REFERENCE TO RELATED APPLICATION

The present application is a divisional of application Ser. No. 12/493,791 filed Jun. 29, 2009 now U.S. Pat. No. 8,215,247, which is a continuation-in-part of U.S. Ser. No. 12/266,310, filed Nov. 6, 2008, now U.S. Pat. No. 7,814,847.

BACKGROUND OF THE INVENTION

The present invention relates generally to agricultural implements and, more particularly, to a seed boot for use with a disc opener that collectively provides a double-shoot, single pass deposition of fertilizer and seed onto a planting surface.

Fertilizer and seed are generally deposited onto a planting surface in either a single shoot or double shoot manner. With a single shoot planting technique, a mixture of seed and fertilizer is deposited into a single furrow and subsequently packed. With a double shoot planting technique, seed and fertilizer are deposited into separate furrows, which may or may not be closely spaced, and then packed.

A single shoot planting device typically has a single delivery hose through which the mixture of granular fertilizer and seed is delivered to the furrow. More particularly, a single shoot planting device will typically include a cutting tip that is dragged at a depth just below the planting surface. The delivery hose extends along a backside of the cutting tip, or knife, so that the fertilizer and seed mixture is deposited into the furrow immediately after the cutting tip cuts into the planting surface. Ideally, the mixture is deposited in to the furrow before the furrow collapses. The furrow is typically packed by a trailing packing or press wheel.

Another configuration of a single shoot planting device replaces the knife with a disc or coulter that rotates at an angle relative to a line of travel to form a furrow or trench in the planting surface. Because of the angling of the disc, the leading face of the disc pushes soil to one side and creates the furrow while the opposite, trailing face of the disc runs in the "shadow" of the leading face. The seed/fertilizer mixture is dropped to the bottom of the furrow while the furrow is held open by the disc and a cooperating plate (or scraper or seed boot) on the other side. The penetration depth of the disc controls the seed depth. A trailing packer wheel closes the furrow after the mixture is deposited and firms the planting surface (soil).

While single shoot planting units are less complex, it is generally preferred to use a double shoot planting unit which allows seed and fertilizer to be separately deposited into the furrow. When the fertilizer and seed are mixed, reduced concentrations of fertilizer must be used to prevent the seed from becoming damaged, i.e., "burnt". In one exemplary double shoot planting unit, a knife has a side tip (side bander) that trails the leading knife as the planting unit is towed along the planting surface. The knife creates a furrow or fertilizer trench and the side bander forms a ledge in the sidewall of the furrow to effectively form a seed trench or seed bed. The fertilizer and seed trenches are separated from one another both horizontally and vertically. This separation provides a fertilizer/seed stratification that has been found to provide better growing conditions, i.e., higher concentrations of fertilizer may be used without seed "burning".

In yet another type of double shoot planting unit a pair of rotating discs are used to form separate fertilizer and seed trenches having horizontal and vertical stratification. The leading disc cuts through the planting surface at an angle to cut a furrow or fertilizer trench. A trailing disc cuts through the side of the furrow formed by the leading disc to cut a seed trench that is generally horizontally and vertical offset from the fertilizer trench. U.S. Pat. No. 5,752,454 describes a dual disc, double shoot planting unit.

Dual disc units, such as that described in U.S. Pat. No. 5,752,454, are relatively complex structures with multiple rotating parts such as the discs themselves and associated bearings. This complexity also adds to the overall cost of the planting unit and the implement. Dual disc units, such as those described in the aforementioned patent, have also been found to perform unsatisfactorily in soft soil conditions. More particularly, the discs are generally angled to essentially "dig" into the soil surface to cut a furrow. Since the discs dig into the surface, less down pressure is needed. In harder soil conditions, the disc will effectively dig into the soil as the soil itself provides bias against which the disc can leverage. However, in soft soil conditions, the disc will essentially "plow" through the soil rather than cut an open furrow. Furthermore, to accommodate the space needed for two rotational elements, the distance between the leading and trailing discs is relatively substantial and can led to disturbance of the furrow before the seed is planted. That is, depending upon soil conditions, the furrow may collapse upon itself before the trailing disc cuts a seed bed into the furrow formed by the leading disc. The spacing between the discs also reduces seeding accuracy in rolling terrain, as well as adding to the overall size, weight, and cost of the carrying frame.

SUMMARY OF THE INVENTION

The present invention is directed to a planting unit for depositing fertilizer and seed in a single pass, double shoot manner in which a rotating disc cuts a furrow in a planting surface and a trailing seed boot, having a cutting edge, cuts a vertically and offset trench in the furrow to form a seed bed in the planting surface. The disc has a mounting frame for mounting the disc to a linkage assembly that is, in turn, coupled to a toolbar mount. The seed boot is also attached to the mounting frame. This common attachment provides a relatively short and compact device without sacrificing fertilizer and seed stratification.

In operation, the rotating disc, which sits at an angle relative to a line of travel, is pulled through the planting surface along the planting surface to cut a furrow into the planting surface. The furrow effectively defines a fertilizer trench into which fertilizer may be deposited from a fertilizer source through a fertilizer tube. The seed boot has a cutting edge that when pulled through the planting surface cuts a seeding trench in the furrow that is offset both vertically and horizontally from the fertilizer trench. Rearward of the cutting edge is a seed tube through which seed is passed and deposited into the seed trench. In one embodiment, a tab extends from a rearward edge of the seed tube that is designed to reduce the fall of seed into the fertilizer trench. In addition, the tab is also operative to reduce the ingress of soil or residue into the seed tube.

It is therefore an object of the invention to provide a planting unit that furrows a planting surface into separate fertilizer and seed trenches with minimal soil disturbance.

It is another object of the invention to provide fertilizer and seed stratification with a rotating disc and a seed boot having a cutting edge, wherein the seed boot and the rotating disc are coupled to a shared mount.

Therefore, in accordance with one aspect of the invention, a planting unit for use with a planting implement having a frame and configured to travel along a line of travel is disclosed. The planting unit has a disc mount configured to be coupled to the frame and a rotatable disc coupled to the disc mount and angled relative to the line of travel of the planting implement. The disc is configured to cut a furrow into a planting surface. A fertilizer tube is mounted to the disc mount and configured to deposit fertilizer into a fertilizer trench formed in the furrow. The planting unit further includes a seed boot coupled to the disc mount rearward of the fertilizer tube and the disc. The seed boot includes a hollow tubular member through which seed may be passed and deposited onto the planting surface, and a cutting edge configured to cut a ledge into the furrow onto which seed may be deposited.

In accordance with another aspect of the invention, a double-shoot, single pass implement for separately depositing fertilizer and seed with horizontal and vertical stratification onto a planting surface includes a toolbar configured to be coupled to a towing vehicle which is designed to pull the frame along the planting surface with a generally longitudinal line of travel. A plurality of disc openers are provided with each opener connected to the toolbar by a respective linkage assembly. Each disc opener includes a disc mount coupled to a corresponding linkage assembly and a rotatable disc mounted to the disc mount and configured to cut at an angle into the planting surface to form a fertilizer trench. A fertilizer tube is provided and is mounted to the disc mount generally adjacent the rotatable disc. Each opener also has a seed boot mounted to the disc mount and configured to cut a seed trench offset from the fertilizer trench. The seed boot includes a seed tube having a forward cutting edge and an outlet rearward of the fertilizer tube, and a tab connected to the seed tube generally opposite the forward cutting edge and extending rearward of the seed tube outlet.

According to yet another aspect of the invention, a furrowing and planting apparatus for use with an agricultural implement has a rotating disc configured to furrow a planting surface to define a fertilizer trench and a fertilizer source adapted to deposit fertilizer onto the fertilizer trench. The apparatus also has a seed boot disposed rearward of the rotating disc that includes a tubular member having a forward cutting edge that cuts a seed trench in the furrow. A deflector is mounted to a rearward edge of the seed boot and is operative to reduce the ingress of soil into the tubular member of the seed boot, particularly during roll back of the agricultural implement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
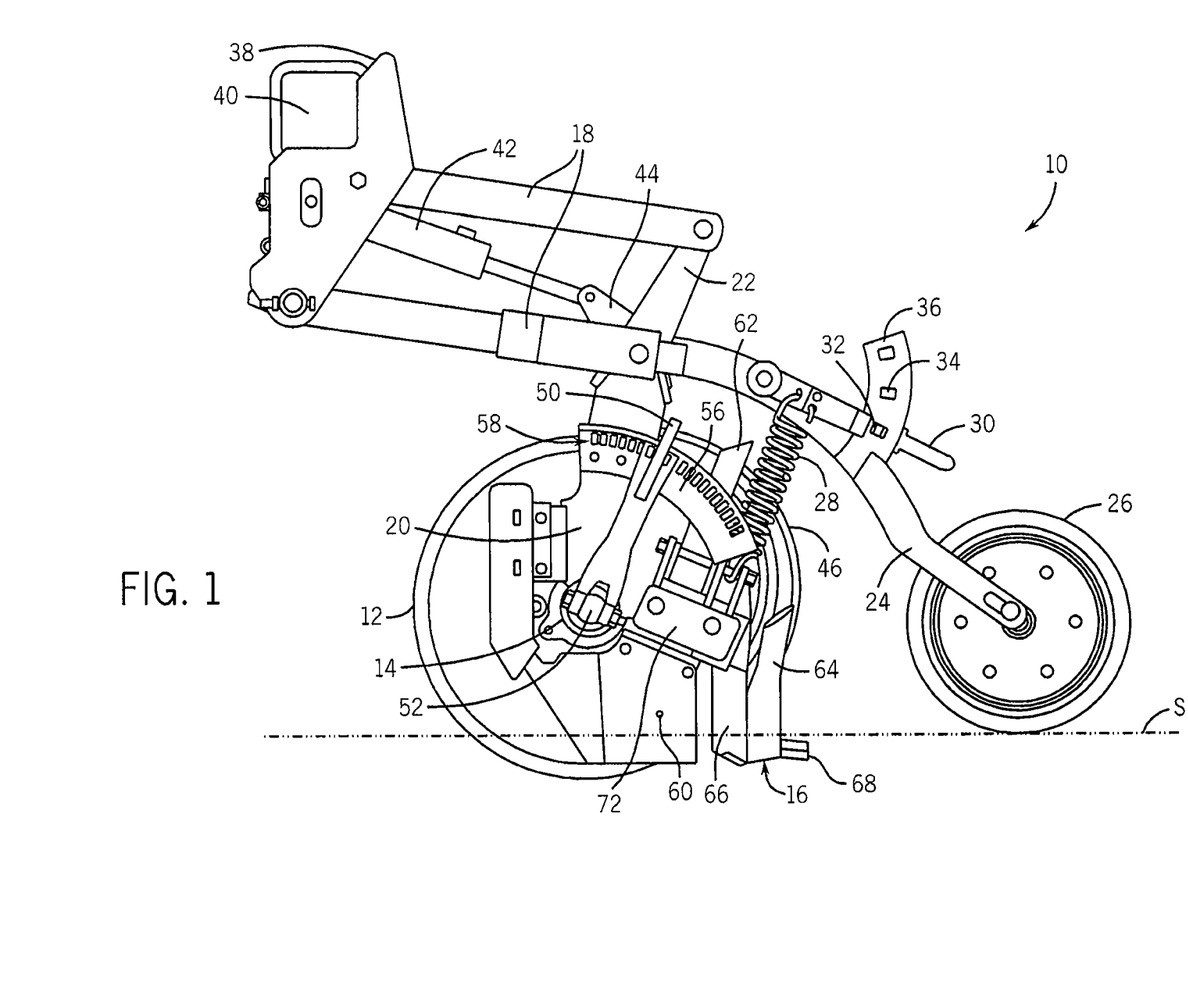
FIG. 1 is a side elevation view of a planting unit according to one embodiment of the invention that includes a tool bar mount for coupling the planting unit to a toolbar of an agricultural implement.

The present invention is generally directed to a planting unit for us with an agricultural implement. While only one planting unit will be described, it is understood that the agricultural implement may include a plurality of such planting units FIG. 1 shows a planting unit 10 according to one embodiment of the invention. The planting unit 10 generally includes a forward disc 12 that is angled relative to a line of travel. As known in the art, the forward disc 12 rotates about a center hub 14 to cut a furrow into the planting surface, S. A seed boot 16 is mounted rearward of the disc 12, and as will be described, is designed to cut a seed trench into the furrow formed by the disc 12. The disc 12 is coupled to a parallel linkage 18 by a disc mount 20 which has a mount arm 22 extending upwardly from the disc mount 20. A trailing arm 24 is also coupled to the parallel linkage 18 and a press or packing wheel 26 is coupled to the trailing arm 24. The press wheel 26 trails the disc 12 and the seed boot 16, and as known in the art, applies a packing pressure to the furrow. The downward force is applied by spring 28, but it is understood that other biasing devices may be used. In addition, the amount of downward force can be varied via lever 30 which has a selector member 32 that can be selectively positioned in one of a series of notches 34 of curved member 36.

Figure 9:
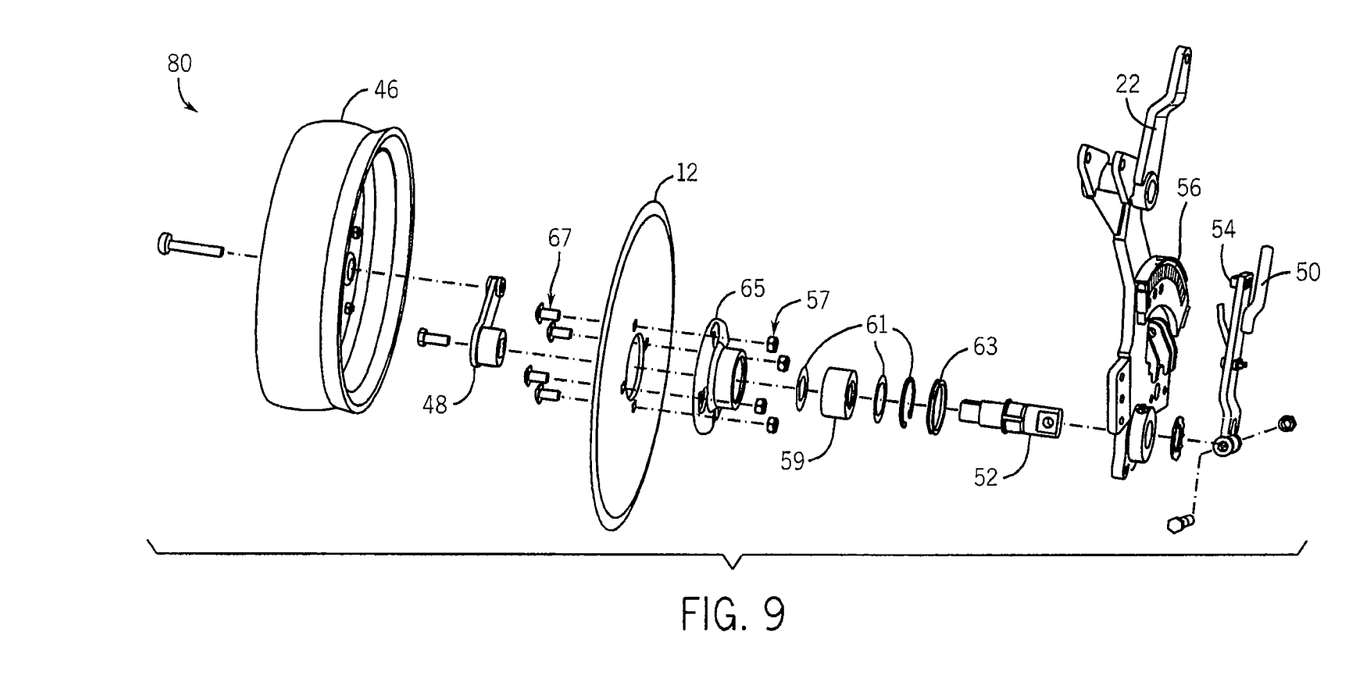
FIG. 9 is an exploded view of the depth adjustment assembly of the planting unit shown in FIG. 1.

The parallel linkage 18 is also coupled to a toolbar mount 38 that is operative to couple the planting unit to a toolbar 40 of an agricultural implement. A hydraulic cylinder 42 is pivotably coupled to the toolbar mount 38 and the mount arm 22 by a bracket 44, but it is understood other devices such as a spring or air bag could be used. The cylinder 42 is operative to apply a downward pressure on the disc 12 to force the disc 12 into contact with the planting surface. With additional reference to FIG. 9, the depth at which the disc 12 cuts into the planting surface is variably set by a gauge wheel 46 and a cooperating gauge wheel arm 48 and a control lever 50. The control lever 50 controls the gauge wheel arm 48 by a crankshaft 52 that extends through the center of the disc 12. The gauge wheel arm 48 is held in place by teeth 54 that interface with a mating fan shaped member 56, which includes a series of notches 58 that individually define a different depth the disc 12 can be set via positioning of the control lever 50. Various fasteners 57, e.g., nuts, bearing 59, washers 61 and seal 63 are used to secure the crankshaft 52 to the disc 12 via a hub 65 that is coupled to the disc 12 by fasteners 67.

In addition to setting the depth at which the disc 12 cuts into the planting surface, the depth gauge wheel 46 keeps the outer surface of the disc 12 generally clear of mud and debris. A scraper blade 60 is mounted opposite the depth gauge wheel 46 is designed to remove dirt, mud, and other debris from the inner surface of the disc 12.

The planting unit 10 is designed to separately drop fertilizer and seed into the furrow in a single pass. In this regard, a fertilizer tube 62 is mounted rearward of the center hub of the disc 12 but forward of the seed boot 16. The seed boot 16 generally includes a seed tube 64 and a cutting member 66 that is forward of the seed tube 64. In operation, as the disc 12 forms a furrow having a relatively deep fertilizer trench in the planting surface, fertilizer is dropped into the fertilizer trench from a fertilizer source (not shown) that communicates with the aforementioned fertilizer tube 62. The cutting member 66 is offset from the disc 12 and cuts into a sidewall of the furrow to form a ledge or seed bed. Seed is then dropped via the seed tube 64 onto the ledge. The seed is fed to the seed tube 64 from a seed source in a known manner.

The cutting member 66 cuts into the sidewall of the furrow such that the ledge is offset horizontally and vertically from the fertilizer trench, i.e., bottom of the furrow. In this regard, the seed is deposited at a position that is spaced horizontally and vertically from the fertilizer that is dropped into the fertilizer trench. As noted above, it is generally preferred to plant seed and drop fertilizer into a furrow with stratification between the fertilizer and the seed.

In one preferred embodiment, the cutting member 66 is angled to lift the soil as the cutting member 66 is urged through the sidewall of the furrow. Thus, as the disc 12 and the cutting member 66 cut through the planting surface, the soil is temporarily displaced and lifted to form trenches for the deposition of fertilizer and seed. However, when disc 12 and the cutting member 66 pass, the soil will tend to fall back onto itself and effectively fill-in the furrow and thus the fertilizer and seed trenches. The press wheel 26, which trails the seed boot 16, then packs the fertilizer and the seed. Alternately, the cutting member 66 may be angled downward to force the soil down onto the fertilizer before the seed is deposited onto the seed bed.

Figure 6:
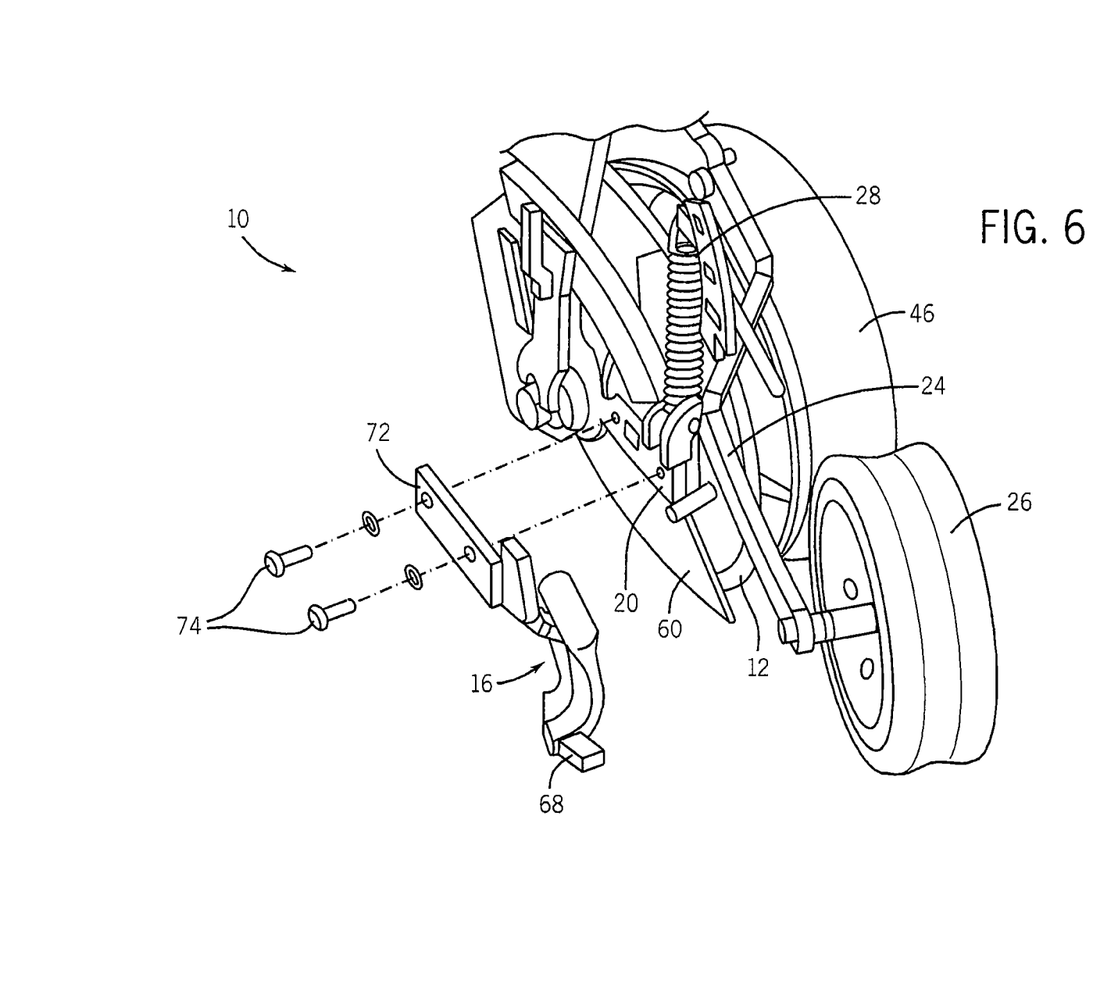
FIG. 6 is a partial exploded view of the planting unit shown in FIG. 1.
Figures 7, 8:
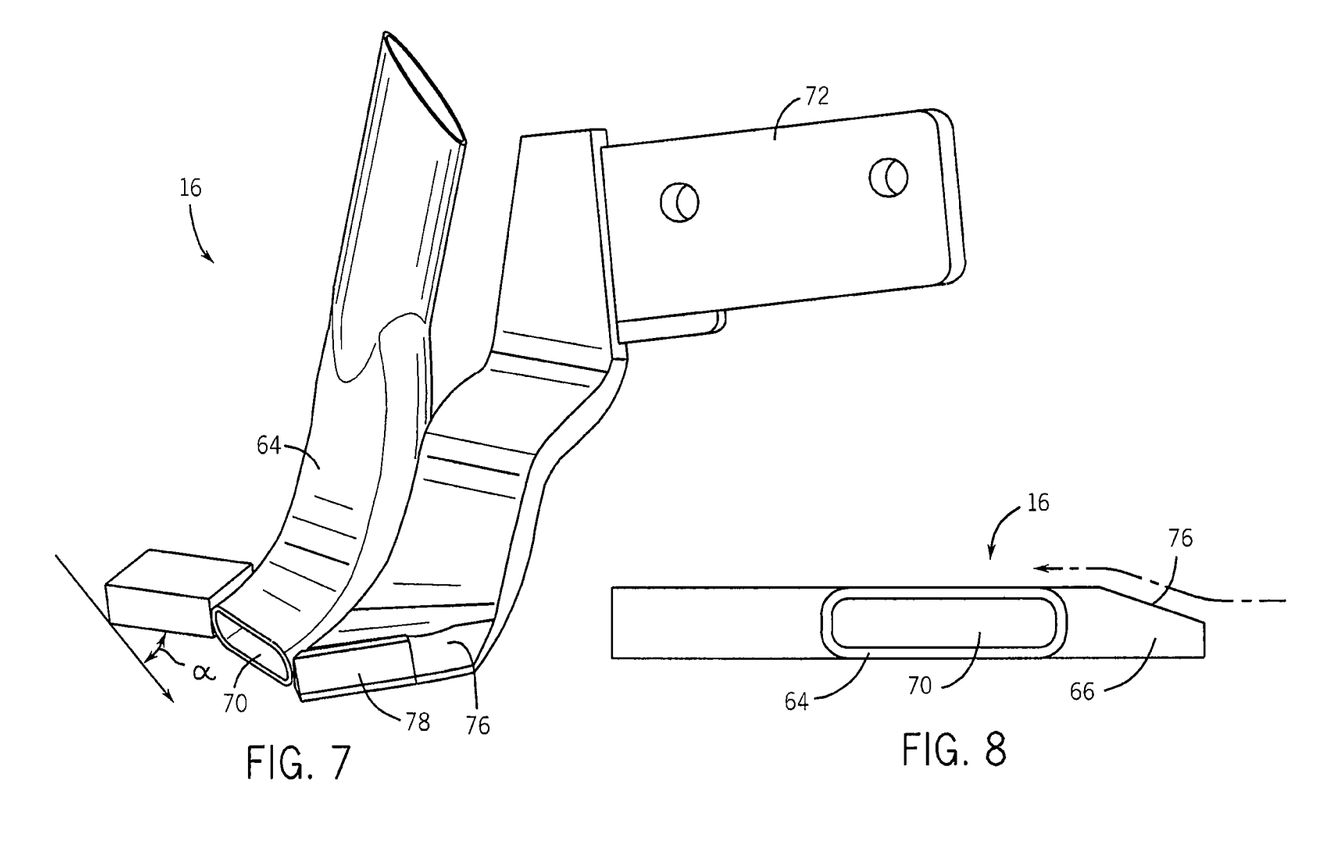
FIG. 7 is an isometric view of the seed boot of the planting unit shown in FIG. 1.
FIG. 8 is an end view of the seed boot shown in FIG. 7.

In one preferred embodiment, a defector tab 68 extends from the backside of the seed tube 64. The deflector tab 68 generally provides two separate functions. First, the deflector tab 68 is angled, as shown in FIGS. 6 and 7, as is the lower ends of the seed tube 64 and the cutting member 66. With this angled orientation, the deflector tab 68 is operative to encourage seed toward the seed trench. Second, because of its proximity to the seed tube 64, the deflector tab 68 reduces the ingress of soil and debris into the seed tube 64 during roll back of the planting unit 10.

Figure 2:
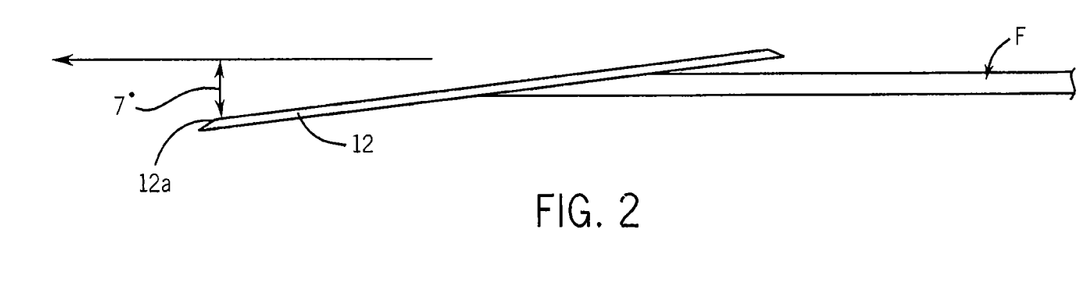
FIG. 2 is a schematic view of the disc of the plating unit shown in FIG. 1 shown relative to a furrow formed along a line of travel.

Referring now to FIG. 2, the disc 12 is angled relative to the furrow F that is formed by the disc 12 as it is rotated. The furrow F is formed generally in-line with the line of travel for the agricultural implement. The disc 12 is angled such that the angle formed between the leading edge 12a of the disc 12 and the line of travel, which generally bisects the furrow F, is approximately 7 degrees. While other angles are contemplated, it is generally preferred that the angle fall between 5 and 10 degrees, and more preferably between 6 and 8 degrees.

It will be appreciated that while the disc is angled relative to the line of travel, the disc is normal to the plane of the planting surface.

Figure 3:
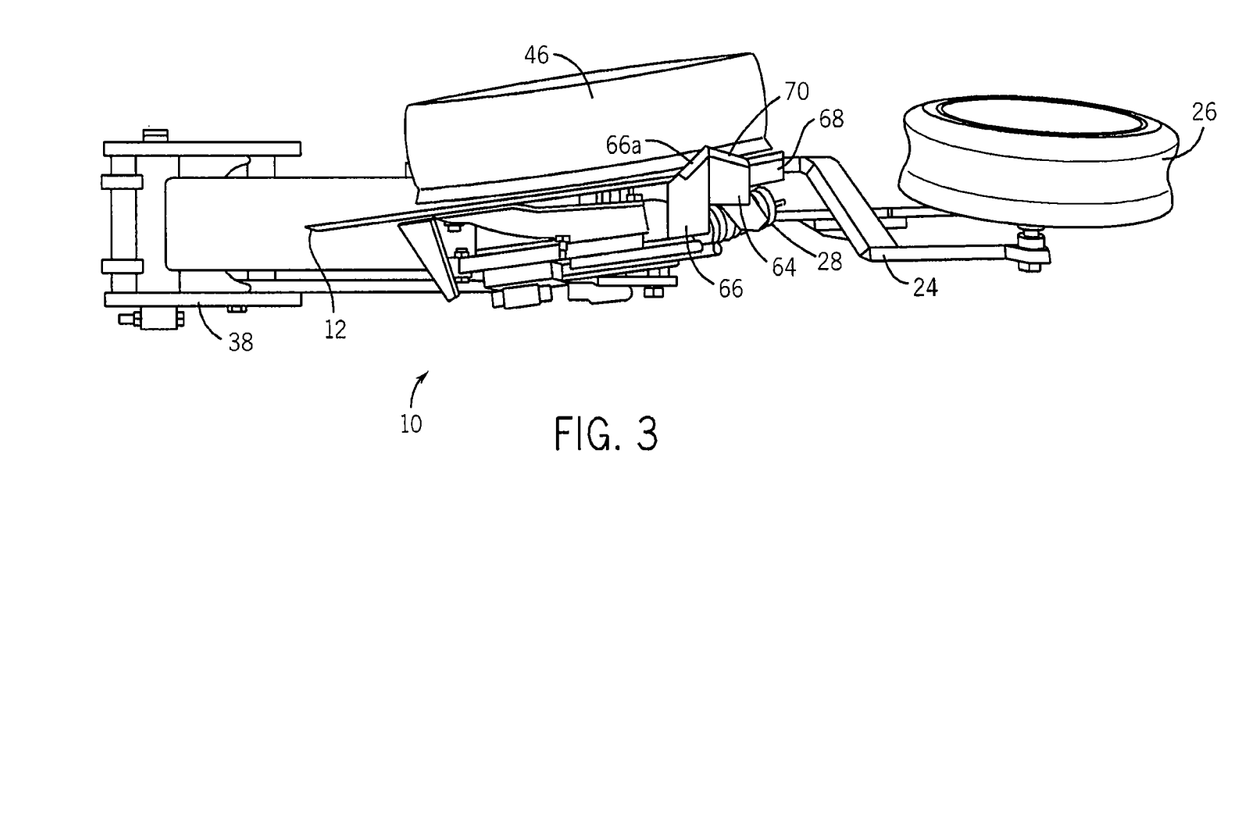
FIG. 3 is a bottom view of the planting unit shown in FIG. 1.
Figure 4:
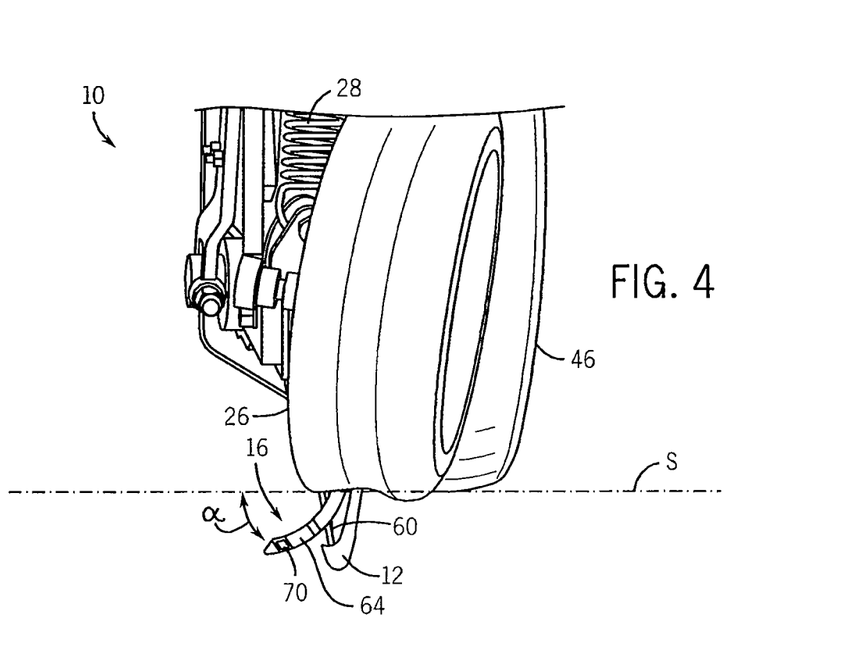
FIG. 4 is a rear elevation view of the planting unit shown in FIG. 1.
Figure 5:
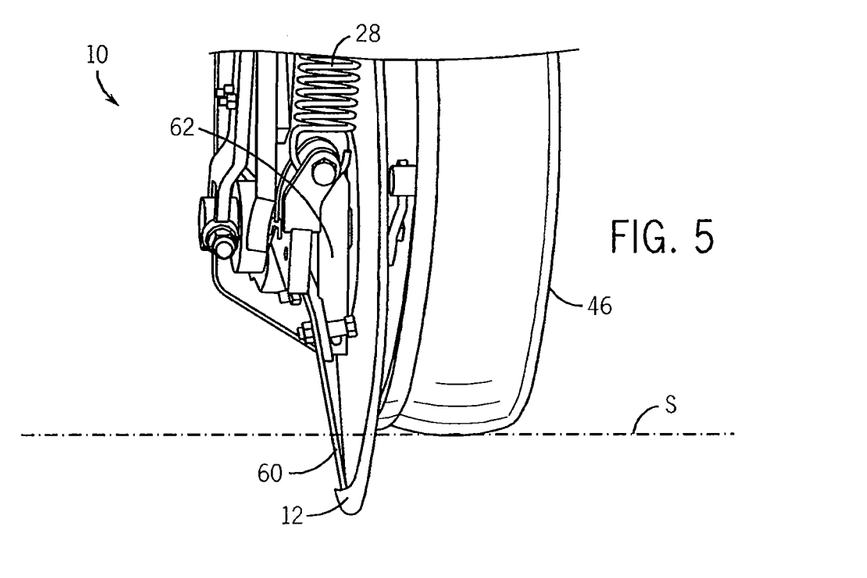
FIG. 5 is a rear elevation view of the planting unit shown in FIG. 1 with a seed boot and packing system removed.

Turning now to FIGS. 3-5, the fertilizer tube 62 is arranged such that the fertilizer falls generally centered in the furrow. The seed tube 64 has an outlet 70 that is angled generally rearward and laterally offset from the outlet (not numbered) of the fertilizer tube. As noted above, the seed trench is formed laterally offset from the fertilizer trench. This offset is formed because the seed boot 16 is generally angled away from disc 12, as particularly shown in FIG. 4, such that the cutting member 66 forms a side bander. The angle defined between the leading edge 66a of the cutting member 66 and an axis transverse to the line of travel is preferably between approximately 5 to approximately 45 degrees. The depth of the seed tube outlet 70 is less than the lower most edge of the disc 12 and the seed tube outlet 70 is laterally offset from the disc 12 clearly illustrating the vertical and horizontal spacing of the fertilizer and seed trenches.

As shown in FIGS. 6 and 7, the seed boot 16 includes a header 72 that may be coupled to the disc mount 20 via fasteners 74. Since the header 72 is mounted to the same mount 20 as the disc 12, the combined assembly is relatively compact when compared to conventional double shoot, single pass planting units.

As shown in FIG. 8, the seed boot 16 is constructed such that seed tube outlet 70 sits behind the cutting member 66. With this construction, the cutting member 66 cuts a ledge into the sidewall of the furrow and seed is placed onto the ledge as the seed drops through the seed tube outlet 70. The cutting member 66 generally includes an angled cutting face 76 that in one embodiment includes a wear resistant insert 78, such as a carbide insert. In one preferred embodiment, the seed tube 64 and the cutting member 66, and its header 72 are formed as a single assembly.

Figure 10:
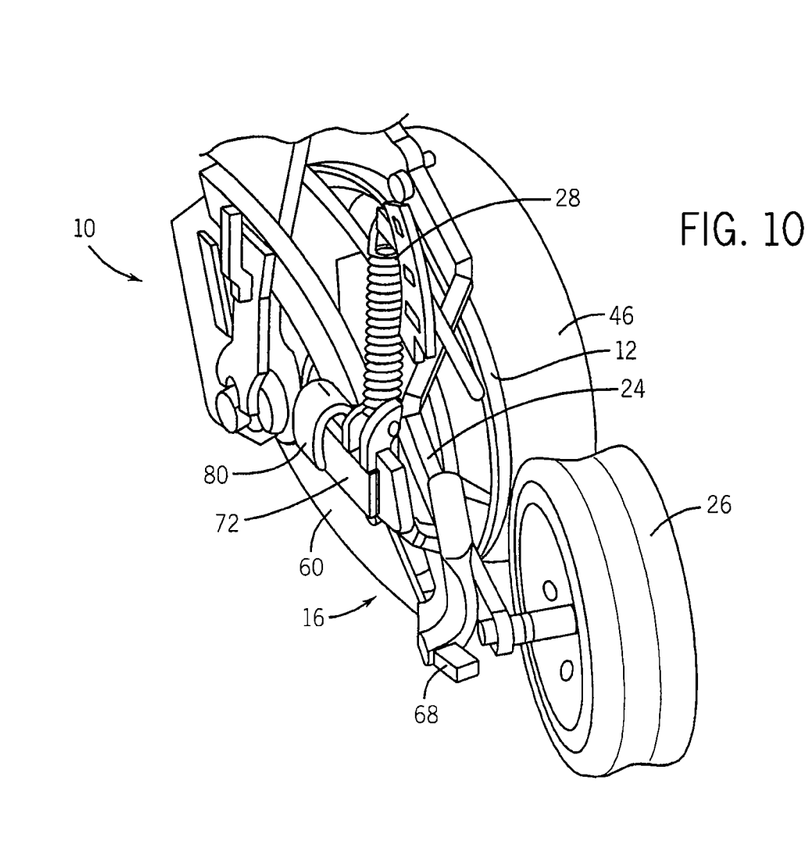
FIG. 10 is an isometric view of a planting unit having a clamped on secondary seed boot according to another embodiment of the invention.
Figure 11:
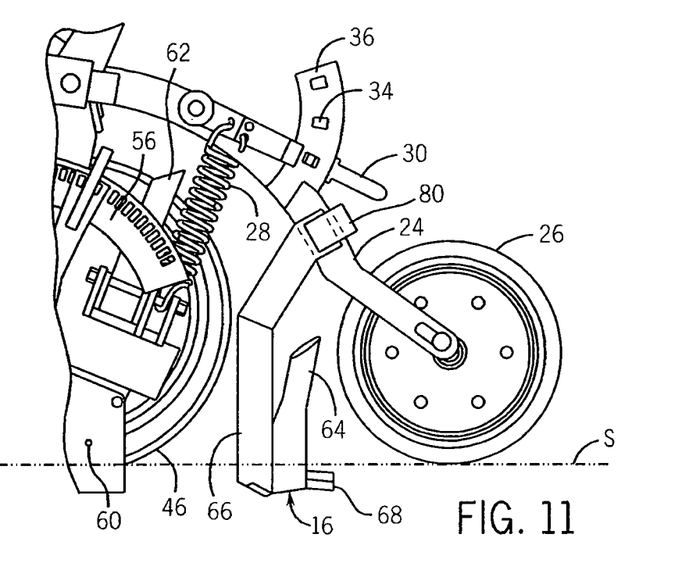
FIG. 11 is a side elevation view of a planting unit having a secondary seed boot clamped to a trailing arm according to a further embodiment of the invention.
Figure 12:
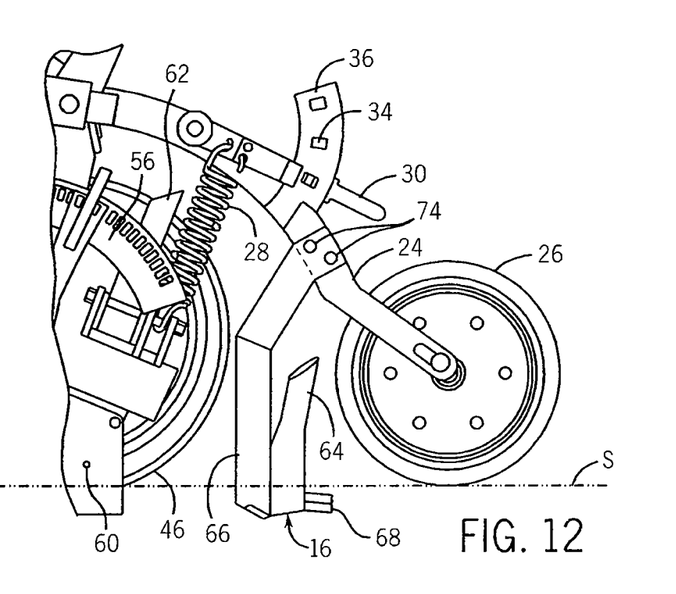
FIG. 12 is a side elevation view of a planting unit having a secondary seed boot fastened to a trailing arm according to yet another embodiment of the invention.

As described above, in one embodiment, the seed boot 16 has a generally flat header 72 with mounting holes (not numbered) formed therein that align with mounting holes in the disc mount 20 and fasteners 74, such as bolts, may be used to couple the seed boot 16 to the disc mount 20. It is understood however that the seed boot 16 could be mounted to the disc mount 20 in other ways. For example, as shown in FIG. 10, a clamp 80 could be used. Similarly, as shown in FIG. 11, clamp 80 could be used to mount the seed boot 16 to the trailing arm 24 of the press wheel 26. In yet another embodiment and referring to FIG. 12, holes (not shown) could be formed in the trailing arm 24 to allow the header 72 of the seed boot 16 to be fastened to the trailing arm 24 using fasteners 74 in a manner similar to the mounting to the disc mount 20 shown in FIG. 6. Whether by a clamp or by fasteners, mounting the seed boot 16 to the trailing arm 24 would allow the seed depth (the depth at which seed or other particulate matter is deposited from the seed boot 16) to be set by the press wheel 26. It will be appreciated that clamps other than the types shown in the figures could be used to clamp the seed boot 16 to either the disc mount 20 or the trailing arm 24.

The present invention provides a planting unit of relatively compact design in which a seed boot and a rotatable disc are mounted to the same disc mount. The seed boot has an angled cutting tip that cuts a ledge into the sidewall of a furrow formed by the rotatable disc. A seed tube rearward of the cutting tip deposits seed onto the ledge. A trailing press wheel then packs the fertilizer and seed. The ledge is cut vertically and horizontally spaced from the bottom of the furrow (fertilizer trench). In this regard, seed and fertilizer are deposited with vertical and horizontal stratification allowing higher concentrations of fertilizer to be used. In addition to providing a compact design, the present invention avoids the complexities associated with double shoot planting units that have multiple discs to cut fertilizer and seed trenches. In addition, the present invention provides less soil disturbance compared to conventional knife style double shoot, single pass planting units, especially when furrowing at faster speeds, e.g., greater than 5 m.p.h.

Many changes and modifications could be made to the invention without departing from the spirit thereof. The scope of these changes will become apparent from the appended claims.

We claim:

1. A planting unit for use with a planting implement having a frame and configured to travel along a line of travel, comprising:
   a disc mountable to the frame and adapted to cut a furrow into a planting surface, the disc having a rotational footprint when the disc is being used to cut the furrow; the disc having a trailing edge;
   a fertilizer tube associated with the disc and configured to deposit fertilizer into a fertilizer trench formed in the furrow;
   a trailing arm coupled to the frame;
   a press wheel rotatably mounted to the trailing arm and configured to pack the furrow cut by the disc, the press wheel having a rotational footprint as the press wheel is packing the furrow; and
   a seed boot mounted to the frame rearward of the fertilizer tube and the disc, the seed boot including a hollow tubular member configured to pass seed, which can be deposited onto the planting surface, and a stationary cutting edge configured to cut a ledge into the furrow onto which seed is deposited, wherein the seed boot sits aft of the rotational footprint of the disc and forward of the rotational footprint of the press wheel; wherein the seed boot has a leading edge that is rearward of the trailing edge of the disc.

2. The planting unit of claim 1 wherein the cutting edge is offset from the disc such that the cutting edge can cut into a sidewall of the furrow to form a seed bed.

3. The planting unit of claim 2 wherein the cutting edge and the hollow tubular member are arranged with respect to the disc so that the seed is deposited at a position that is spaced horizontally and vertically from the fertilizer that is deposited into the fertilizer trench.

4. The planting unit of claim 1 wherein the seed boot is mounted to the frame by way of an attachment between the seed boot and the trailing arm.

5. The planting unit of claim 4 wherein the attachment between the seed boot and the trailing arm includes a bracket.

6. The planting unit of claim 1 wherein an angle is defined between the cutting edge and an axis that is transverse to the line of travel, and wherein the angle is between about 5 degrees and about 45 degrees.

7. The planting unit of claim 1 wherein the hollow tubular member includes an outlet through which the seed passes to exit the seed boot and wherein the outlet of the hollow tubular member faces away from the disc.

8. The planting unit of claim 7 wherein the outlet of the hollow tubular member is laterally offset from the disc.

* * * * *